United States Patent [19]

McGill

[11] 4,297,046
[45] Oct. 27, 1981

[54] TURNBUCKLE

[76] Inventor: Roy F. McGill, 538 W. Popular St., Gastonia, N.C. 28052

[21] Appl. No.: 117,644

[22] Filed: Jan. 29, 1980

[51] Int. Cl.³ .......................... F16B 7/06; F16G 11/12
[52] U.S. Cl. ........................................ 403/46; 152/242
[58] Field of Search .................. 403/43, 44, 45, 46, 403/47, 48; 152/242, 241

[56] References Cited

U.S. PATENT DOCUMENTS

| | | | |
|---|---|---|---|
| 622,286 | 4/1899 | Steinmetz | 403/44 |
| 1,490,091 | 4/1924 | Carver | 403/46 |
| 3,025,901 | 3/1962 | Bengert | 152/241 UX |

FOREIGN PATENT DOCUMENTS

| | | | |
|---|---|---|---|
| 352480 | 4/1961 | Switzerland | 403/43 |
| 385612 | 12/1932 | United Kingdom | 152/241 |

*Primary Examiner*—Andrew V. Kundrat
*Attorney, Agent, or Firm*—Harvey B. Jacobson

[57] ABSTRACT

A pair of side-by-side oppositely facing and threaded eyebolts are provided and threaded in parallel side-by-side bores in a common nut structure to define a turnbuckle. One of the eye portions of the eyebolt is open defining an open throat hook with which a closed ring-type anchor member may be releasably engaged and a sleeve is mounted on the shank of the same eyebolt between the nut and the open eyebolt throat and is shiftable along the eyebolt shank into and out of position closing the throat for releasably locking an associated closed ring-type anchor member within the hook. The sleeve is engageable by the common nut structure for displacing the sleeve toward its throat closing position and the common nut structure additionally includes friction structure for adjustably frictionally resisting rotation of the shank portions of the eyebolts relative to the nut structure.

7 Claims, 5 Drawing Figures

U.S. Patent  Oct. 27, 1981  4,297,046
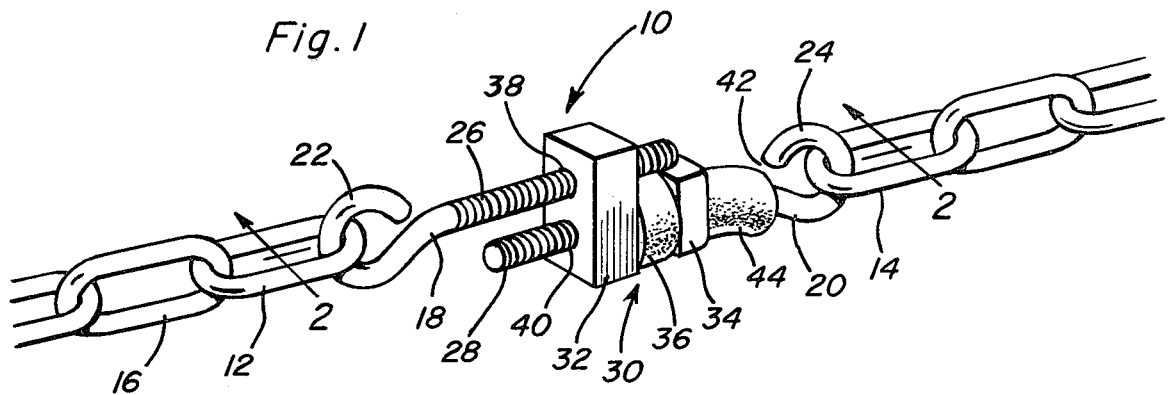
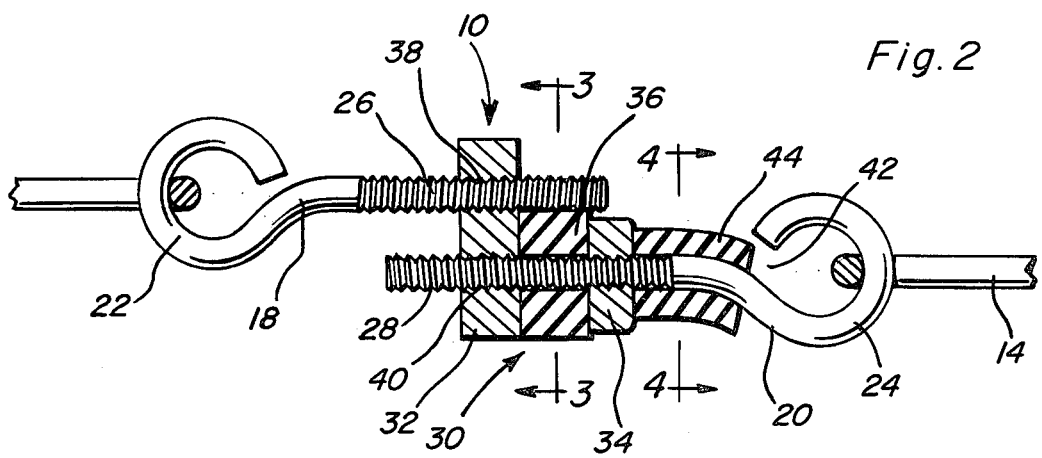
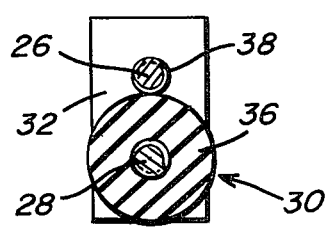
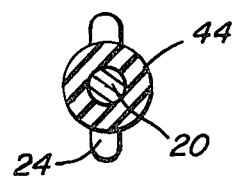
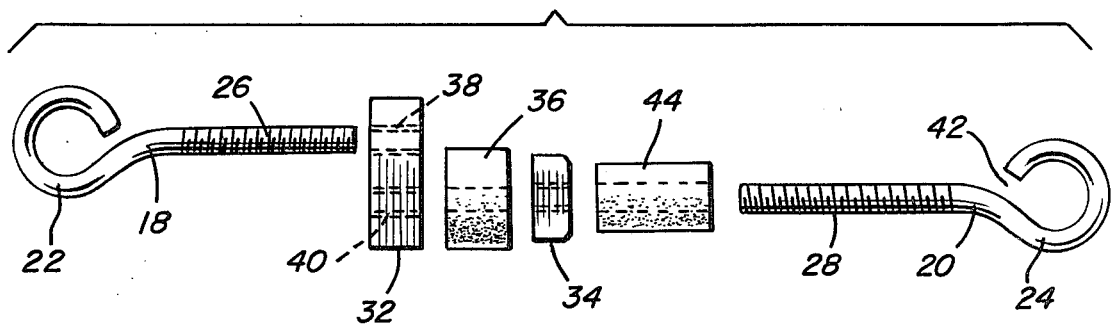

TURNBUCKLE

BACKGROUND OF THE INVENTION

Various forms of combined tighteners and fasteners are utilized to secure cable and link chain ends together. One particular link chain end securing operation is that which is accomplished by the attaching and tightening fasteners generally associated with the side chains on vehicle wheel skid chains. However, these combined tighteners and fasteners have only limited adjustment capacity, independent of being engaged with the next side chain link, with the result that the associated vehicle wheel skid chains may be only loosely applied, or one or two end links of an associated side chain must remain loose and may engage a fender of the associated vehicle as the wheel turns and render damage to the fender or the paint thereon. Accordingly, a need exists for an improved form of skid chain side chain fastener and tightener and with the fastener and tightener being capable of ready operation by inexperienced persons and reliable to effect secure anchoring of adjacent ends of a skid chain side chain together.

Although various forms of combined fasteners and tighteners including some of the general structural and operational features of the instant invention have been heretofore designed such as those structures disclosed in U.S. Pat. Nos. 141,191, 2,299,526, 3,051,519 and 4,009,765, these previously known devices are not well suited for use in securing the adjacent ends of a skid chain side chained together.

BRIEF DESCRIPTION OF THE INVENTION

The combined fastener and tightener of the instant invention has been specifically designed for use in conjunction with vehicle wheel skid chains, but also realizes effective and efficient fastening and tightening functions in other invironments. The combined fastener and tightener is in the form of a modified turnbuckle construction and includes a pair of eyebolts with the eye portion of one of the eyebolts closed and permanently anchored to one end of a side chain and the eye portion of the other eyebolt open to define a hook having a restricted throat area through which the end link on the other end of the side.chain may be passed. The modified turnbuckle construction includes a central common nut structure for variably overlapping the threaded ends of the eyebolts and a locking sleeve mounted on the shank of the open eye equipped eyebolt and engageable by the nut structure for movement into position to close the associated throat against the removal of the corresponding side chain end link therefrom as a result of the turnbuckle construction being tightened.

The main object of this invention is to provide an improved fastener and tightener for the side chains of a vehicle wheel skid chain.

Another object of this invention is to provide an apparatus in accordance with the preceding objects and constructed in a manner whereby it may be used effectively by inexperienced persons.

Still another important object of this invention is to provide an improved side chain fastener and tightener including structure whereby the adjusted tightness of the side chain effected thereby may be maintained.

Another important object of this invention is to provide a side chain fastener and tightener which will be operative to effect a fail-safe attachment between adjacent side chain ends.

Another object of this invention to be specifically enumerated herein is to provide a combined fastener and tightener in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the turnbuckle of the instant invention in operative association with a pair of adjacent side chain ends;

FIG. 2 is an enlarged fragmentary sectional view taken substantially upon the plane indicated by the section line 2—2 of FIG. 1;

FIG. 3 is a transverse vertical sectional view taken substantially upon the plane indicated by the section line 3—3 of FIG. 2;

FIG. 4 is a transverse sectional view taken substantially upon the plane indicated by the section line 4—4 of FIG. 2; and FIG. 5 is an exploded side elevational view of the turnbuckle.

DETAILED DESCRIPTION OF THE INVENTION

Referring now more specifically to the drawings, the numeral 10 generally designates the turnbuckle of the instant invention which is illustrated in FIGS. 1 and 2 of the drawings as comprising a combined fastener and tightener between adjacent end links 12 and 14 of a skid chain side chain 16.

The turnbuckle 10 includes a pair of eyebolts 18 and 20 whose eye portions 22 and 24 are closed and opened, respectively. The eyebolts 18 and 20 include oppositely threaded shank portions 26 and 28 and a nut assembly referred to in general by the reference numeral 30 including a first nut 32, a second nut 34 and a resilient sleeve 36 is utilized to secure the eyebolts 18 and 20 in laterally spaced and adjusted longitudinally overlapped positions. The nut 32 has a pair of oppositely threaded laterally spaced and parallel bores 38 and 40 formed therethrough in which the threaded shank portions 26 and 28 are threadedly engaged. The sleeve 36 is constructed of resilient material so as to be axially compressible and radially (inwardly and outwardly) expandable and the sleeve 36 is disposed on the shank portion 28 intermediate the nut 32 and the nut 34. The nut 34 is threaded on the shank portion 28 between the nut 32 and the open throad 42 of the eye portion 24 and the nut 34 may be turned relative to the nut 32 in oder to variably axially compress, and thus variably radially expand, the sleeve 36. In addition, an elongated resilient sleeve 44 is disposed on the shank portion 28 between the nut 34 and the throat 42 and is frictionally retained in position on the shank portion 28. However, the sleeve 44 is engageable by the nut 34 upon movement of the nut 34 along the shank portion 28 toward the throat 42 in order to displace the end of the sleeve 44 adjacent the throat 42 into the latter for locking the end link 14 against removal from the eye portion 24. Further, it is pointed out that the nut 34 is square in transverse cross section and, accordingly, that once the end of the shank portion 26 remote from the eye portion 22 is laterally registered with the nut 34, the latter may not be turned either with the shank portion 28 or relative thereto, the corner portions of the nut 34 not having sufficient clearance to swing past the adjacent free end of the shank portion 26.

Upon tightening the nut 34 (moving the latter toward the nut 32 independent of relative movement of any of the other components of the turnbuckle 10) the sleeve 36 is axially compressed and radially expanded inwardly in frictional engagement with the shank portion 28 and applies axial thrust on the nuts 32 and 34 thereby increasing frictional resistance to relative turning between the shank portion 28 and the nuts 32 and 34. In addition, as the sleeve 36 is axially compressed, it is radially outwardly expanded into tighter engagement with the free end of the shank portion 26 laterally registered therewith. This, of course, also increases frictional resistance to turning of the shank portion 26 relative to the nut 32.

It is also pointed out that when the nut 34 is tightened to axially compress the sleeve 36, the frictional resistance between the opposite ends of the sleeve 36 and the nuts 32 and 34 resist relative rotation of the nuts 32 and 34 on the shank portion 28. Thus, the entire nut assembly 30 may be rotated as a unit relative to the shank portion 28. Also, the entire nut assembly 30 may be rotated as a unit relative to the shank portion 26.

When the turnbuckle 10 is utilized to secure the end links 12 and 14 together, the end link 14 is engaged in the eye portion 24 when the nut assembly 30 is backed off slightly along the shank portion 28 in order to enable the sleeve 44 to be shifted sufficiently to the left as viewed in FIG. 2 of the drawings to allow the end link 14 to be received through the throat 42. Thereafter, the nut assembly 30 is turned as a unit in a clockwise direction as viewed from the left side of FIG. 2 in order to increase the longitudinal overlap of the shank portions 28 and 36 and to thereby reduce the spacing between the eye portions 22 and 24. In addition, movement of the nut assembly 30 along the shank portion 28 toward the eye portion 24 will cause the sleeve 44 to be advanced along the shank portion 28 into position projecting into and thus closing the throat 42 of the eye portion 24. In this manner, accidental disengagement of the end of link 14 from the eye portion 24 is prevented.

Although the turnbuckle 10 has been disclosed herein as being specifically adapted for use in securing the two end links 12 and 14 of the side chain 16 together and also for the purpose of tightening the side chain 16 about the associated wheel (not shown), it will be noted that the turnbuckle 10 may also be utilized in other environments wherein it is desired to secure the ends of tension members together in a manner enabling the tension thereon to be varied as desired.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A turnbuckle construction including a pair of first and second opposite end generally parallel and oppositely threaded shank members having adjacent and remote ends, center nut means defining a pair of oppositely threaded generally parallel bores formed therethrough in which said adjacent ends are threadedly engaged, the remote ends of said first and second shank members including first and second anchor means, respectively, for anchoring relative to associated tension members, said first anchor means including an open throat hook formed on the end of said first shank remote from and opening toward said second shank and with which a closed ring type anchor member may be engaged, said first shank including a throat closing member mounted on said first shank for movement therealong toward and away from position closing and opening said throat, said throat closing member being engageable by said nut means, upon threaded movement of the latter on said first shank toward said throat, to move said throat closing member into position closing said throat to prevent disengagement of said anchor member from said hook, said nut means including a first nut member in which said pair of oppositely threaded bores are formed in side-by-side relation and a second nut member threaded on one of said shank members, and an axially compressible and radially expandable friction member having a friction bore formed therethrough and disposed on said one shank member between said nuts for adjustable axial compression therebetween and radial inward expansion into frictional engagement with the portion of said one shank passing through said friction bore.

2. The combination of claim 1 wherein said throat closing member comprises a sleeve member slidable on said first shank member between said throat and said nut.

3. The combination of claim 2 wherein said sleeve member comprises a resilient sleeve member yieldingly frictionally engaged with and retained in adjusted position along said first shank member.

4. The combination of claim 1 wherein the outer periphery of said friction member closely opposes the other shank member and is radially expandable into frictional engagement therewith upon axial compression of said friction member.

5. A turnbuckle construction including a pair of first and second opposite end generally parallel and oppositely threaded shank members having first adjacent and second remote ends, center nut means defining a pair of oppositely threaded generally parallel bores formed therethrough in which said adjacent ends are threadedly engaged, the remote ends of said first and second shank members including first and second anchor means, respectively, for anchoring relative to associated tension members, said shank member adjacent ends being disposed in laterally offset relation and said bores being similarly laterally offset relative to each other, one of said shank members having an abutment thereon intermediate said nut means and said second end thereof, and an axially compressible and radially expandable friction sleeve member disposed on said one shank member intermediate said nut means and abutment for axial compression therebetween, the outer periphery of said friction sleeve member closely opposing the other shank member and being radially expandable into frictional engagement therewith upon axial compression of said friction sleeve member.

6. A turnbuckle construction including a pair of first and second opposite end generally parallel and oppositely threaded shank members having adjacent and remote ends, center nut means defining a pair of oppositely threaded generally parallel bores formed therethrough in which said adjacent ends are threadedly engaged, the remote ends of said first and second shank members including first and second anchor means, respectively, for anchoring relative to associated tension members, said nut means includes a first nut member in which said pair of oppositely threaded bores are formed in side-by-side relation and a second nut member threaded on one of said shank members, and an axially compressible and radially expandable friction member having a friction bore formed therethrough and disposed on said one shank member between said nuts for adjustable axial compression therebetween and radial inward expansion into frictional engagement with the portion of said one shank passing through said friction bore.

7. The combination of claim 6 wherein the outer periphery of said friction member closely opposes the other shank member and is radially expandable into frictional engagement therewith upon axial compression of said friction member.

* * * * *